(12) United States Patent
Wang et al.

(10) Patent No.: US 9,288,802 B2
(45) Date of Patent: Mar. 15, 2016

(54) METHOD, DEVICE, AND SYSTEM FOR SENDING AND RECEIVING CONTROL CHANNEL INFORMATION

(71) Applicant: Huawei Technologies Co., Ltd., Shenzhen (CN)

(72) Inventors: Chongfa Wang, Hefei (CN); Ling Qiu, Hefei (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/285,926

(22) Filed: May 23, 2014

(65) Prior Publication Data
US 2014/0254472 A1    Sep. 11, 2014

Related U.S. Application Data

(63) Continuation of application No. PCT/CN2012/084858, filed on Nov. 20, 2012.

(30) Foreign Application Priority Data

Nov. 25, 2011   (CN) .......................... 2011 1 0382487

(51) Int. Cl.
*H04W 4/00* (2009.01)
*H04W 72/04* (2009.01)
*H04B 7/04* (2006.01)
(Continued)

(52) U.S. Cl.
CPC .............. *H04W 72/042* (2013.01); *H04B 7/026* (2013.01); *H04B 7/0456* (2013.01); *H04B 7/14* (2013.01); *H04B 7/155* (2013.01); *H04L 25/03898* (2013.01)

(58) Field of Classification Search
None
See application file for complete search history.

(56) References Cited

U.S. PATENT DOCUMENTS 7,426,201 B2 *   9/2008   Kim ..................... H04B 7/2637
                                                                                370/329
8,565,151 B2 * 10/2013   Goransson ............ H04L 1/0029
                                                                                370/328
(Continued)

FOREIGN PATENT DOCUMENTS

CN          1494337 A      9/2003
CN          1287539 C     11/2006
(Continued)

OTHER PUBLICATIONS

Japanese Notice of Allowance received in Application No. 2014-542694 mailed May 26, 2015, 3 pages.
(Continued)

*Primary Examiner* — Frank Duong
(74) *Attorney, Agent, or Firm* — Slater & Matsil, L.L.P.

(57) ABSTRACT

The present invention discloses a method, device, and system for sending and receiving control channel information. When a base station schedules a first relay, the base station selects a second relay according to an optimal precoding code book selected by the first relay. An optimal precoding code book selected by the second relay is orthogonal to the optimal precoding code book selected by the first relay. Control channel information of the first relay and control channel information of the second relay his encapsulated into a high speed downlink shared control channel HS-SCCH, and scrambling the HS-SCCH. The scrambled HS-SCCH is sent to the first relay and the second relay.

20 Claims, 6 Drawing Sheets

(51) Int. Cl.
*H04B 7/14* (2006.01)
*H04B 7/02* (2006.01)
*H04L 25/03* (2006.01)
*H04B 7/155* (2006.01)

(56) References Cited

U.S. PATENT DOCUMENTS

| | | |
|---|---|---|
| 2004/0063436 A1 | 4/2004 | Braun et al. |
| 2005/0233754 A1 | 10/2005 | Beale |
| 2005/0249306 A1 | 11/2005 | Chae et al. |
| 2009/0034461 A1* | 2/2009 | Pelletier ............ H04L 25/03343 370/329 |
| 2010/0009718 A1 | 1/2010 | Higuchi et al. |
| 2010/0142633 A1 | 6/2010 | Yu et al. |
| 2014/0226735 A1* | 8/2014 | Zhang ................. H04B 7/0452 375/260 |

FOREIGN PATENT DOCUMENTS

| | | |
|---|---|---|
| CN | 101034935 A | 9/2007 |
| CN | 102006617 A | 4/2011 |
| CN | 102111844 A | 6/2011 |
| CN | 102118869 A | 7/2011 |
| EP | 2557700 A2 | 2/2013 |
| JP | 2008092374 A | 4/2008 |
| JP | 2010521873 A | 6/2010 |
| RU | 2341021 C2 | 12/2008 |
| WO | 2011044734 A1 | 4/2011 |
| WO | 2011123747 A1 | 10/2011 |
| WO | 2011126341 A2 | 10/2011 |
| WO | 2011127404 A2 | 10/2011 |

OTHER PUBLICATIONS

Decision on Grant a Patent for Invention with English translation received in Russian Application No. 2014125537/07 (041606) mailed Jun. 2, 2015, 22 pages.
3GPP: Multiple Input Multiple Output in UTRA (Release 7), Technical Report, TR 25.876 V7.0.0, Mar. 2007, 76 pages.
3GPP: Evolved Universal Terrestrial Radio Access (E-UTRA): Further Advancements for E-UTRA Physical Layer Aspects (Release 9), Technical Report, TR 36.814 V9.0.0, Mar. 2010, 104 pages.
3GPP: Multiplexing and Channel Coding (FDD) (Release 10), Technical Specification, TS 25.212 V10.1.0, Dec. 2010, 116 pages.

* cited by examiner

METHOD, DEVICE, AND SYSTEM FOR SENDING AND RECEIVING CONTROL CHANNEL INFORMATION

This application is a continuation of International Application No. PCT/CN2012/084858 filed on Nov. 20, 2012, which claims priority to Chinese Patent Application No. 201110382487.0, filed on Nov. 25, 2011, both of which are hereby incorporated by reference in their entireties.

TECHNICAL FIELD

The present invention relates to the field of communication technologies and, in particular embodiments, to a method, device, and system for sending and receiving control channel information.

BACKGROUND

The downlink of a WCDMA (Wideband Code Division Multiple Access) system uses an HSDPA (High Speed Downlink Packet Access) technology to provide high-speed downlink transmission. Relays are introduced into the WCDMA system, which can provide more reliable transmission and higher system throughput. This effectively improves coverage of the system. Because physical locations of multiple relays are far away from each other, channels from a base station to different relays are uncorrelated. Two relays with good orthogonality are selected from multiple relays to perform MU-MIMO (Multi-User Multiple-Input Multiple-Output) transmission, which may use multiple antennas of the base station to achieve higher throughput performance.

In the prior art, when the base station uses the MU-MIMO technology to serve two relays simultaneously, the base station uses HS-SCCH (Shared Control Channel for HS-DSCH) Type 3 for transmitting a single data block. It uses two HS-SCCHs to respectively transmit control channel information of HS-PDSCHs of the two MU-MIMO relays. To enable a specified user to perform reception, the information of the HS-SCCH is scrambled by using an identifier of the specified user. Two HS-SCCHs use respective relay identifiers for scrambling. The two relays descramble the control channel information after receiving respective control channel information.

When MU-MIMO transmission from the base station to two relays is performed, the base station may use two independent HS-SCCHs to respectively transmit control channel information of the two relays. However, on the one hand, the control channel information of the two relays includes the same channelization code bits, and using two HS-SCCHs may cause additional overheads such as a CRC (Cyclic Redundancy Check, cyclic redundancy check) code and a message header; on the other hand, every pair of MU-MIMO relays uses two HS-SCCHs, which may result in an exponential increase of used HS-SCCHs; if two groups of MU-MIMO relays are scheduled, four HS-SCCHs are used. In this case, control channels are all occupied but there are still remaining data code channels, which results in a big waste of resources and a decrease of throughput. The case of scheduling one group of MU-MIMO relays is similar.

SUMMARY

To solve the problem of a waste of channel resources and decrease of throughput in the prior art, embodiments of the present invention provide a method, device, and system for sending and receiving control channel information. The technical solutions are as follows:

In one aspect, a method for sending control channel information is provided. When a base station schedules a first relay, the base station selects a second relay according to an optimal precoding code book selected by the first relay. An optimal precoding code book selected by the second relay is orthogonal to the optimal precoding code book selected by the first relay. Control channel information of the first relay and control channel information of the second relay is encapsulated into a high speed downlink shared control channel (HS-SCCH), and scrambling the HS-SCCH. The scrambled HS-SCCH is sent to the first relay and the second relay.

In another aspect, a method for receiving control channel information is provided. A high speed downlink received by a first relay and a shared control channel (HS-SCCH) sent by a base station, where control channel information of the first relay and control channel information of a second relay are encapsulated in the HS-SCCH. An optimal precoding code book selected by the second relay is orthogonal to an optimal precoding code book selected by the first relay. The first relay descrambles the HS-SCCH to obtain the control channel information of the first relay.

In another aspect, a base station is provided. A selecting module is configured to select a second relay according to an optimal precoding code book selected by the first relay when the base station schedules a first relay. The optimal precoding code book selected by the second relay is orthogonal to the optimal precoding code book selected by the first relay. An encapsulating module is configured to encapsulate control channel information of the first relay and control channel information of the second relay into a high speed downlink shared control channel (HS-SCCH), and scramble the HS-SCCH. A sending module is configured to send the scrambled HS-SCCH to the first relay and the second relay.

In another aspect, a first relay is provided. A receiving module is configured to receive a high speed downlink shared control channel (HS-SCCH) sent by a base station, where control channel information of the first relay and control channel information of a second relay are encapsulated in the HS-SCCH. An optimal precoding code book selected by the second relay is orthogonal to an optimal precoding code book selected by the first relay. A descrambling module is configured to descramble the HS-SCCH to obtain the control channel information of the first relay.

In another aspect, a system for sending and receiving control channel information is provided and the system includes the above base station and the above first relay.

The technical solutions provided by the embodiments of the present invention provide the following beneficial effects. When the base station performs transmission for two relays, one HS-SCCH serves two relays, which reduces occupation of limited HS-SCCHs. As compared with the mode in which either of two relays uses one HS-SCCH, a waste of data code channels caused by limited HS-SCCHs is well reduced, and therefore system throughput is improved.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following further describes the embodiments of the present invention in detail with reference to the accompanying drawings.

In a WCDMA system, data is transmitted on an HS-PDSCH (High Speed Physical Downlink Shared Channel), while control channel information such as the spreading code, modulation, coding, and HARQ of the data channel is transmitted on a corresponding HS-SCCH. The HS-SCCH uses a fixed spreading factor and modulation scheme, and shares a spreading code channel whose spreading factor is 16 with other common channels such as pilot channels, common control channels, and paging indicator channels. In this case, the number of HS-SCCHs provided within a scheduling period in the system is limited.

TS 25.212 specifies four types of HS-SCCHs: type1 is used for transmission of a non-type2 UE in a non-MIMO mode, type2 is used for an HS-SCCH-less mode, type3 is used for configuring a UE in a MIMO mode, and type4 is used for bearing signaling. The HS-SCCH of type 3 includes information such as modulation, coding, data block size, and precoding of the data channel, and may transmit information of only one data stream, or may also transmit information of two data streams.

Figure 1:
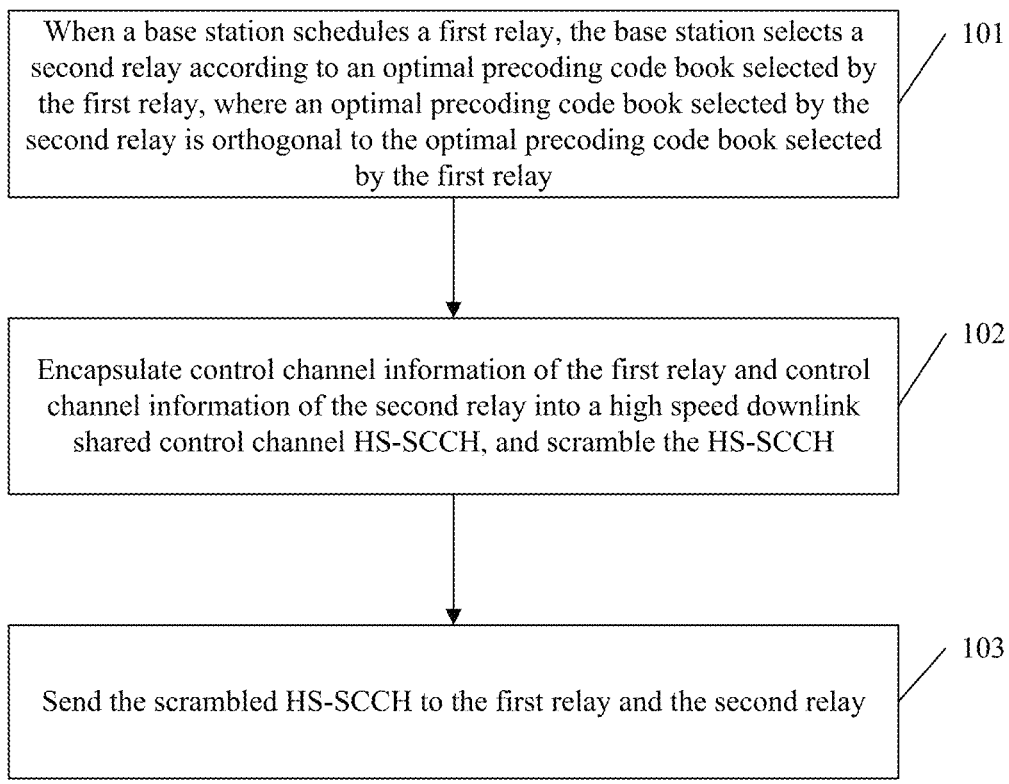
FIG. 1 is a flowchart of a method for sending control channel information according to an embodiment of the present invention.

Referring to FIG. 1, this embodiment provides a method for transmitting control channel information. The method includes the following steps.

101. When a base station schedules a first relay, the base station selects a second relay according to an optimal precoding code book selected by the first relay, where an optimal precoding code book selected by the second relay is orthogonal to the optimal precoding code book selected by the first relay.

102. Encapsulate control channel information of the first relay and control channel information of the second relay into a high speed downlink shared control channel HS-SCCH, and scramble the HS-SCCH.

103. Send the scrambled HS-SCCH to the first relay and the second relay.

In this embodiment, preferably, the scrambling the HS-SCCH includes obtaining a first joint identifier of the first relay and the second relay according to identifier information of the first relay and identifier information of the second relay and scrambling the HS-SCCH according to the first joint identifier.

The obtaining a first joint identifier of the first relay and the second relay according to the identifier information of the first relay and the identifier information of the second relay includes performing an exclusive-OR operation on the identifier information of the first relay and the identifier information of the second relay to obtain the first joint identifier of the first relay and the second relay.

The method in this embodiment further includes sending, by the base station, the identifier information of the second relay to the first relay, so that the first relay can calculate the first joint identifier according to the identifier information of the first relay and the identifier information of the second relay. It can descramble the HS-SCCH according to the first joint identifier after receiving the scrambled HS-SCCH.

Optionally, in this embodiment, before the base station sends the identifier information of the second relay to the first relay, the method further includes encrypting the identifier information of the second relay.

Optionally, in this embodiment, before the base station schedules the first relay, the method includes the following. The base station receives optimal precoding code book information fed back by the first relay. An orthogonal relay set of the first relay is obtained according to the optimal code book information of the first relay. The orthogonal relay set of the first relay is sent to the first relay, so that the first relay can obtain information of a second joint identifier according to identifier information of relays in the orthogonal relay set and can descramble the HS-SCCH according to the second joint identifier after receiving the scrambled HS-SCCH.

The method embodiment of the present invention provides the following beneficial effects. When the base station performs transmission for two relays, one HS-SCCH serves two relays, which reduces occupation of limited HS-SCCHs. As compared with the mode in which either of two relays uses one HS-SCCH, a waste of data code channels caused by limited HS-SCCHs is well reduced, and therefore system throughput is improved.

Figure 2:
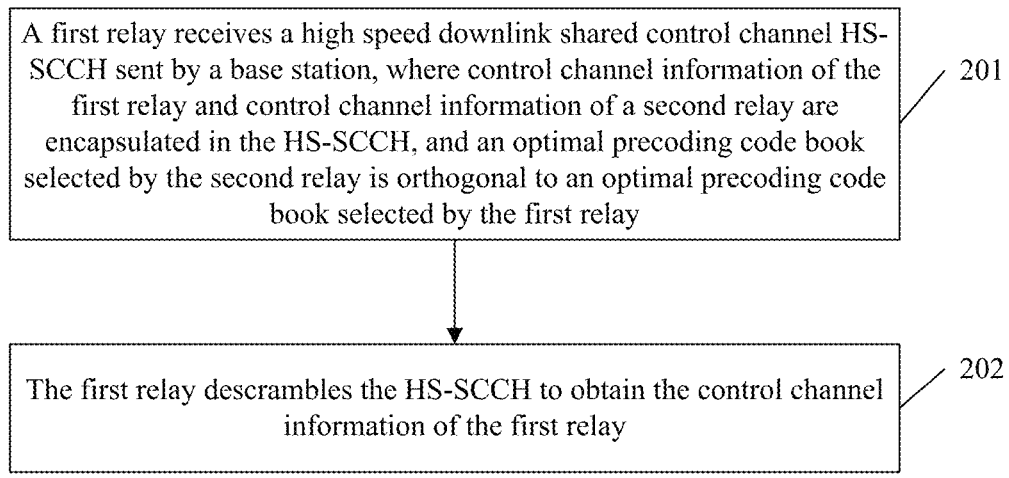
FIG. 2 is a flowchart of a method for receiving control channel information according to an embodiment of the present invention.

Referring to FIG. 2, this embodiment provides a method for receiving control channel information, where the method includes the following steps.

201. A first relay receives a high speed downlink shared control channel HS-SCCH sent by a base station, where control channel information of the first relay and control channel information of a second relay are encapsulated in the HS-SCCH. An optimal precoding code book selected by the second relay is orthogonal to an optimal precoding code book selected by the first relay.

202. The first relay descrambles the HS-SCCH to obtain the control channel information of the first relay.

Preferably, in this embodiment, when the HS-SCCH uses a first joint identifier of the first relay and the second relay for scrambling, the method further includes receiving, by the first relay, identifier information of the second relay broadcast by the base station, and obtaining the first joint identifier of the first relay and the second relay according to identifier information of the first relay and the identifier information of the second relay.

The descrambling, by the first relay, the HS-SCCH to obtain the control channel information of the first relay includes descrambling, by the first relay, the HS-SCCH according to the first joint identifier to obtain the control channel information of the first relay.

Optionally, in this embodiment, when the HS-SCCH uses the first joint identifier of the first relay and the second relay for scrambling, the method further includes feeding back, by the first relay, optimal precoding code book information of the first relay to the base station, so that the base station obtains an orthogonal relay set of the first relay according to the optimal precoding code book information of the first relay and receiving, by the first relay, the orthogonal relay set of the first relay sent by the base station, and obtaining information of a second joint identifier according to identifier information of relays in the orthogonal relay set.

The descrambling, by the first relay, the HS-SCCH includes descrambling, by the first relay, the HS-SCCH according to the second joint identifier.

The method embodiment of the present invention provides the following beneficial effects. When the base station performs transmission for two relays, one HS-SCCH serves two relays, which reduces occupation of limited HS-SCCHs. After receiving the HS-SCCH, the first relay and the second relay respectively descramble the HS-SCCH to obtain corresponding control channel information. As compared with the mode in which either of two relays uses one HS-SCCH, a waste of data code channels caused by limited HS-SCCHs is well reduced, and therefore system throughput is improved.

Figure 3:
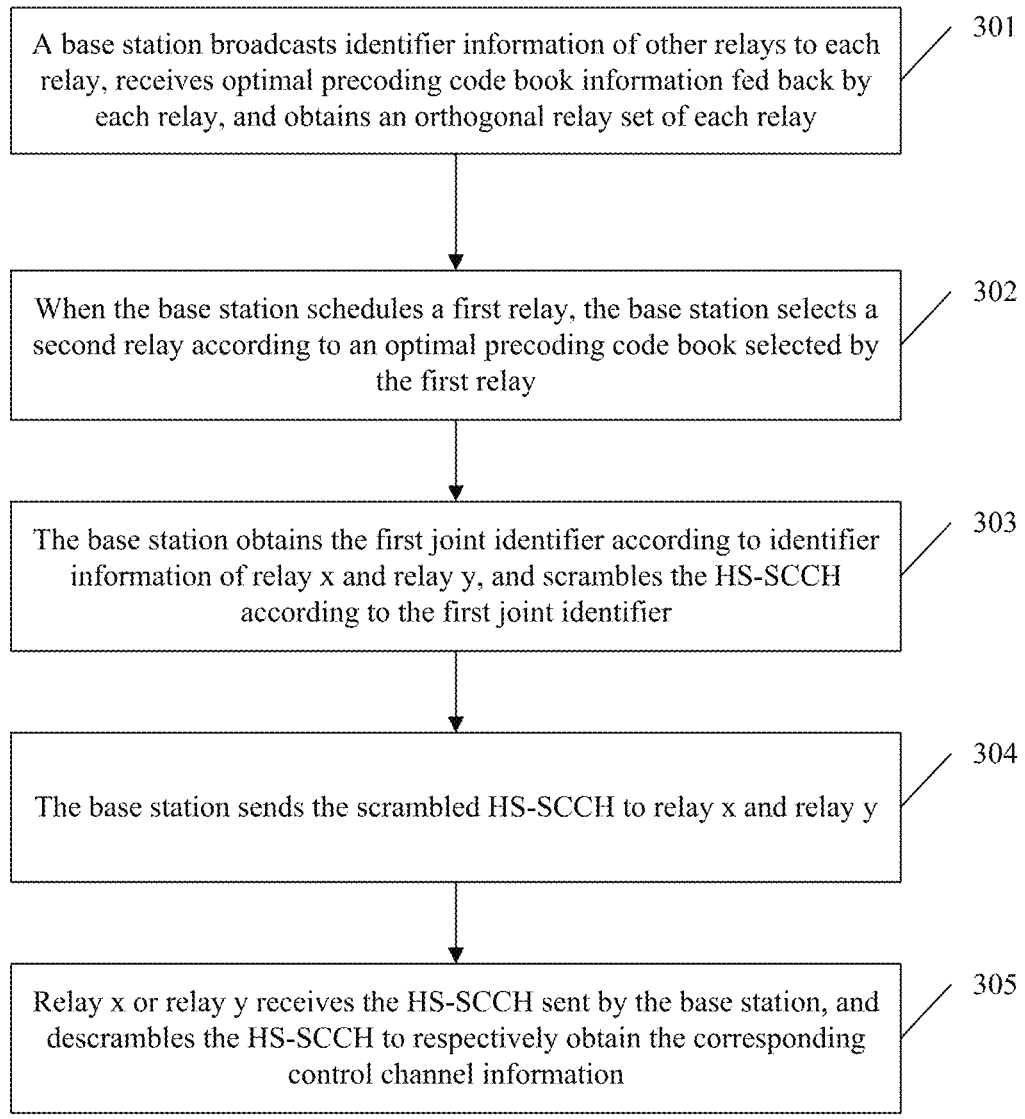
FIG. 3 is a flowchart of a method for transmitting control channel information according to an embodiment of the present invention.

Referring to FIG. 3, this embodiment provides a method for sending control channel information. A base station selects two relays with good orthogonality from multiple relays to perform MU-MIMO transmission, and when performing MU-MIMO transmission for the two relays, uses an HS-SCCH of type 3 to transmit control channel information of HS-PDSCH channels of the two relays. To enable the two relays to identify and decode the required information, the relay identifier in the HS-SCCH is a joint identifier of the two relays, where the method specifically includes the following steps.

301. A base station broadcasts identifier information of other relays to each relay, receives optimal precoding code book information fed back by each relay, and obtains an orthogonal relay set of each relay.

In this embodiment, preferably, the base station broadcasts identifier information of other relays to each relay. The base station may broadcast identifier information of each relay to other relays when the system is initialized or a new relay joins, or during periodic triggering, which is not specifically limited by this embodiment. In this way, each relay may know identifier information of other relays, and after subsequently receiving an HS-SCCH, may descramble a joint code according to the identifier information of the relay and identifier information of other relays.

In this embodiment, preferably, to avoid unlawful interception of other devices, before the base station broadcasts the identifier information of each relay to other relays, the base station encrypts the identifier information of each relay broadcast by the base station to other relays. For example, the base station separately sends identifier information of relays to each relay, and performs an XOR (exclusive-or) operation on other relay identifiers and the relay identifier. In this way, only the target relay can use an XOR operation to obtain other relay identifiers. Of course, in addition to the XOR operation, other encryption modes may be used, which are not specifically limited by this embodiment.

In this embodiment, the precoding design of the base station in WCDMA system uses a receiver-based code book feedback mode. TS 25.876 provides four used code books, each of which is orthogonal to a corresponding code book. TS 25.876 is a standard in the prior art, and is not further described in this embodiment. In a multi-antenna system, the base station achieves a spatial multiplexing gain by using a precoding method. The receiver-based optimal code book feedback is a quantized precoding design and feedback method. A code book is actually a precoding code book and is a set. The optimal code book is the best one selected from code books according to a rule. This belongs to the prior art, and is not described in detail in this embodiment. In this embodiment, each relay selects a precoding code book that can achieve maximum throughput, and other relays also select respective optimal code books. An orthogonal relay means that the optimal precoding code books selected by two relays are orthogonal. Each relay feeds back its optimal precoding code book information. The base station determines the orthogonal relay set of each relay according to the optimal code book of each relay. If the code books respectively selected by two relays are orthogonal, it is considered that the two relays are orthogonal. Assuming a single sector in WCDMA system has four relays a, b, c, and d, each relay feeds back an optimal precoding code book, and the orthogonal relay set of code books selected by other relays and the code book selected by relay a is marked with T(a), which includes relays that may potentially perform MU-MIMO with relay a. Likewise, the relay sets that may potentially perform MU-MIMO with relays b, c, and d are T(b), T(c), and T(d). Because the channel from the base station to the relay changes relatively slowly, T(a), T(b), T(c), and T(d) remain unchanged for a long time.

302. When the base station schedules a first relay, the base station selects a second relay according to an optimal precoding code book selected by the first relay.

In this embodiment, the base station receives optimal coding code book information fed back by the first relay, obtains the orthogonal relay set of the first relay according to the optimal code book information of the first relay, and optionally, sends the orthogonal relay set of the first relay to the first relay. This is so that the first relay can obtain information of a second joint identifier according to identifier information of relays in the orthogonal relay set, and can descramble the HS-SCCH according to the second joint identifier after receiving the scrambled HS-SCCH. The second joint identifier may be a joint identifier of any relay in the orthogonal set of the first relay and the first relay. In this embodiment, the base station may schedule any relay. When the base station schedules and selects relay x, the base station queries the orthogonal set T(x) of relay x, namely, selects a second relay according to information of the optimal precoding code book selected by the first relay. If the set T(x) is not null, the base station selects, according to a rule of orthogonality of the first relay and the second relay, relays y and x in T(x) to compose a MU-MIMO set (x, y). In this embodiment, through power allocation of the base station between two relays, system throughput is maximized in the case that the two relays use the same number of spreading code channels. In this embodiment, if T(x) is null, the base station transmits relay x information to relay x, and the base station uses one HS-SCCH to transmit the spreading code channel and modulation and coding information of the data channel for relay x, which belongs to the prior art and is not further described in this embodiment. In this embodiment, relay x is a first relay and relay y is a second relay.

303. The base station obtains a first joint identifier according to identifier information of relay x and relay y, and scrambles the HS-SCCH according to the first joint identifier.

In this embodiment, in the case that two MU-MIMO relays (x, y) are scheduled, the base station encapsulates control channel information of the two relays into one HS-SCCH, and scrambles the channel. Preferably, in this embodiment, the joint identifier of the two relays is used to scramble the HS-SCCH. The joint identifier is obtained by performing a joint operation f(x, y) for identifiers of the two relays, which is not specifically limited in this embodiment. Specifically, the joint identifier of relay x and relay y may be obtained through an XOR(x, y) operation, which is not intended to limit the present invention. In this embodiment, the joint identifier of the first relay and the second relay is used as a first joint identifier.

In this embodiment, because the HS-SCCH includes control channel information of the two relays, the control channel information of the two relays may be ordered according to the values of identifiers x and y of the two relays. Alternatively, the order of the two pieces of control channel information may distinguish positions of the two pieces of relay information by cyclically shifting one sequence before the operation. The sequence obtained by cyclically right-shifting x by 1 bit is indicated by x1, and the sequence obtained by cyclically right-shifting y by 1 bit is indicated by y1. If information of relay x is located before information of relay y, the corresponding joint identifier is f(x, y1). If information of relay y is located before information of relay x, the joint identifier is f(x1, y). Of course, there may be other methods for distinguishing the control channel information of the two relays, which are not specifically limited by this embodiment.

304. The base station sends the scrambled HS-SCCH to relay x and relay y.

In this embodiment, the base station encapsulates the control channel information of relay x and the control channel information of relay y into one HS-SCCH, and scrambles the HS-SCCH. Through the HS-SCCH, the base station sends the control channel information of relay x and the control channel information of relay y to relay x and relay y.

305. Relay x or relay y receives the HS-SCCH sent by the base station, and descrambles the HS-SCCH to respectively obtain the corresponding control channel information.

In this embodiment, after relay x receives HS-SCCH setting information of RRC layer signaling, relay x descrambles the relay identifier according to a spreading code channel, corresponding to the HS-SCCH, in the information. Preferably, to reduce complexity of blindly descrambling the joint identifier by the relay, after each relay feeds back the respectively selected optimal code book to the base station, the base station obtains the orthogonal relay set of each relay, and may send the information of the set to the corresponding relay through signaling. In this case, when relay x descrambles the user identifier of the channel, relay x only needs to use the joint identifier of relay x and the relays in T(x) to perform descrambling. The relay may order occurrence probabilities of various combinations of identifiers correctly descrambled by the relay, and blindly descramble the relay identifiers sequentially according to the order. In this embodiment, if the base station scrambles the HS-SCCH through an exclusive-OR operation, descrambling needs to be performed through an inverse exclusive-OR operation. Descrambling relay identifiers belongs to the prior art, and is not further described in this embodiment.

In this embodiment, if the base station does not notify the obtained orthogonal set of each relay to each relay. For example, if there is no signaling for notifying the T(x) set of relay x, relay x orders occurrence probabilities of various combinations of identifiers correctly descrambled by relay x, and blindly descrambles the relay identifiers sequentially according to the order. In this embodiment, relay x blindly descrambles the received HS-SCCH, where the used relay identifiers include x, and the joint relay identifier f(x, r) of relay r with which relay x may perform MU-MIMO, where the joint relay identifier f(x, r) is known by relay x. Relay r may be relay y, or may be other relays. If the HS-SCCH can be correctly descrambled, it indicates that the HS-SCCH carries relay x information. The HS-SCCH is demodulated and decoded, and the data channel is demodulated and decoded according to the included information. If relay x cannot correctly descramble the received HS-SCCH, it indicates that the HS-SCCH does not carry relay x information, and no further processing is required for the HS-SCCH.

To help those skilled in the art to better understand the method provided by this embodiment, the following simulation scenarios are provided.

Figure 4:
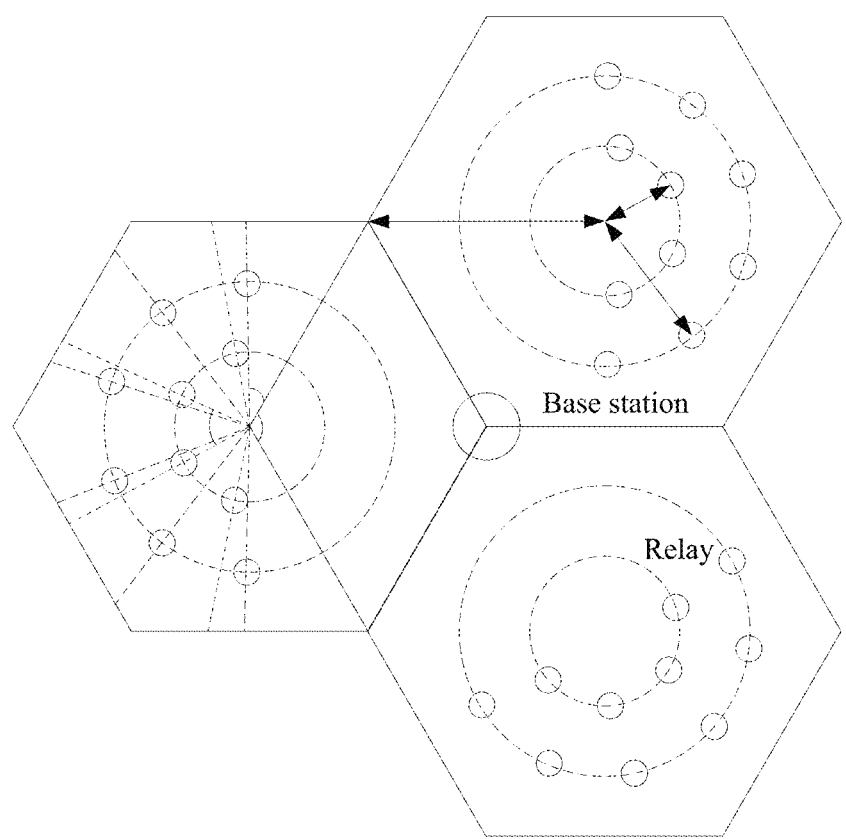
FIG. 4 is a schematic diagram of arrangement of relays according to an embodiment of the present invention.

It is assumed that the base station covers seven cells, where each cell has three sectors, and each sector has 32 users and 10 relays. Power of the base station is 43 dBm, power of the relay is 33 dBm, the distance (ISD) between two neighboring base stations is 1732 meters, and a type3i receiver is used. For the relay channel model, reference may be made to TR 36.814. Arrangement of relays in each cell is shown in FIG. 4. As shown in FIG. 4, each circle indicates a relay, and the base station is located at the common vertex of the three sectors.

Figure 5:
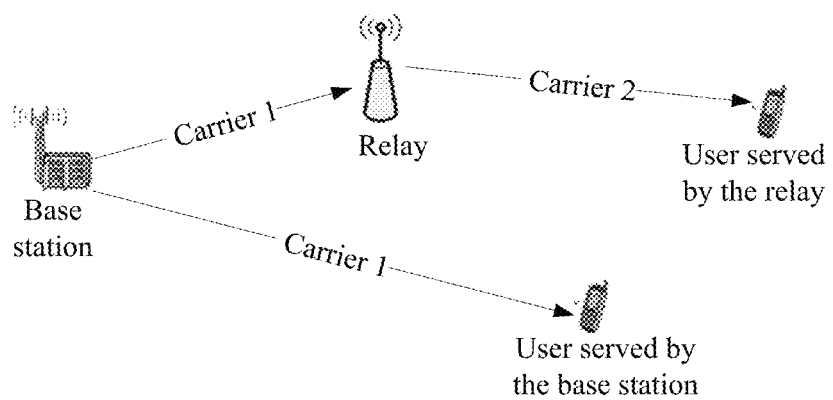
FIG. 5 is a schematic diagram of allocation of carriers according to an embodiment of the present invention.

The system uses two carries in total. The carrier allocation solution is shown in FIG. 5, where carrier 1 is used for transmission from the base station to all relays and from the base station to users served by the base station, and carrier 2 is used for transmission from each relay to users served by the relays.

Simulation comparison solution: Single-stream transmission (SU-MIMO) is used from the base station to a single relay, and MU-MIMO is used from the base station to two relays, in the cases that each pair of relays uses one or two control channels.

Through simulation, the following is obtained. Using MU-MIMO (one HS-SCCH) from the base station to the relay achieves an 11.81% gain of average user throughput in comparison with using SU-MIMO from the base station to the relay, and using one HS-SCCH achieves a 6.97% gain of average user throughput in comparison with using two HS-SCCHs, as shown in Table 1. A statistic result of user throughput may be obtained at a time when one channel (for the channel model, refer to TR 36.814) from the base station to the relay is generated, and the average results of statistics collected for four times are shown in Table 1.

TABLE 1

|  | Average User Throughput (kbps) | Gain as Compared with SU-MIMO (%) |
| --- | --- | --- |
| SU-MIMO | 401.48 | 0 |
| MU-MIMO, two HS-SCCHs | 421.20 | 4.91% |
| MU-MIMO, one HS-SCCH | 448.90 | 11.81% |

The method embodiment of the present invention provides the following beneficial effects. When the base station performs MU-MIMO transmission for two relays, one HS-SCCH serves two MU-MIMO relays, which reduces occupation of limited HS-SCCHs. As compared with the mode in which either of two MU-MIMO relays uses one HS-SCCH, a waste of data code channels caused by limited HS-SCCHs is well reduced, and therefore system throughput is improved. Meanwhile, to avoid interception of other illegal devices, the identifier information may be encrypted before the identifier information is broadcast to each relay, so that information security is improved. Further, after obtaining the orthogonal relay set of each relay, the base station sends the orthogonal relay set of each relay to each relay, so that each relay can obtain the joint identifier of relays in the orthogonal relay set and the relay. When each relay descrambles the HS-SCCH, complexity of blind descrambling can be reduced, so that the speed of descrambling is increased.

Figure 6:
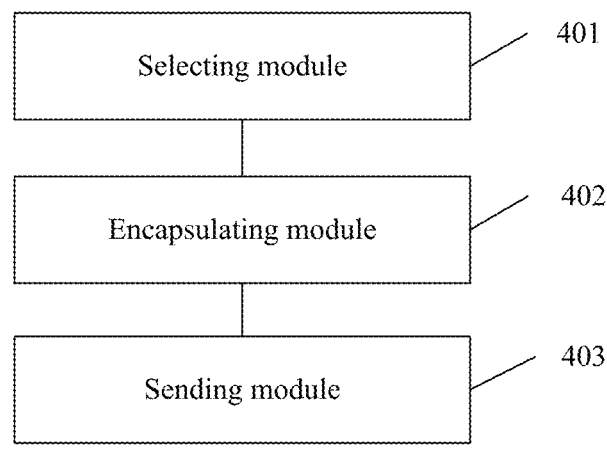
FIG. 6 is a schematic diagram of a base station according to another embodiment of the present invention.

Referring to FIG. 6, an embodiment of the present invention provides a base station, including: a selecting module 401, an encapsulating module 402, and a sending module 403.

The selecting module 401 is configured to when the base station schedules a first relay, selects a second relay according to an optimal precoding code book selected by the first relay. An optimal precoding code book selected by the second relay is orthogonal to the optimal precoding code book selected by the first relay.

The encapsulating module 402 is configured to encapsulate control channel information of the first relay and control channel information of the second relay into a high speed downlink shared control channel HS-SCCH, and scramble the HS-SCCH.

The sending module 403 is configured to send the scrambled HS-SCCH to the first relay and the second relay.

Preferably, in this embodiment, the encapsulating module 402 includes a scrambling unit, configured to obtain a first joint identifier of the first relay and the second relay according to identifier information of the first relay and identifier information of the second relay, and scramble the HS-SCCH according to the first joint identifier.

Preferably, in this embodiment, the scrambling unit includes a calculating subunit, which is configured to perform an exclusive-OR operation on the identifier information of the first relay and the identifier information of the second relay to obtain the first joint identifier of the first relay and the second relay.

Figure 7:
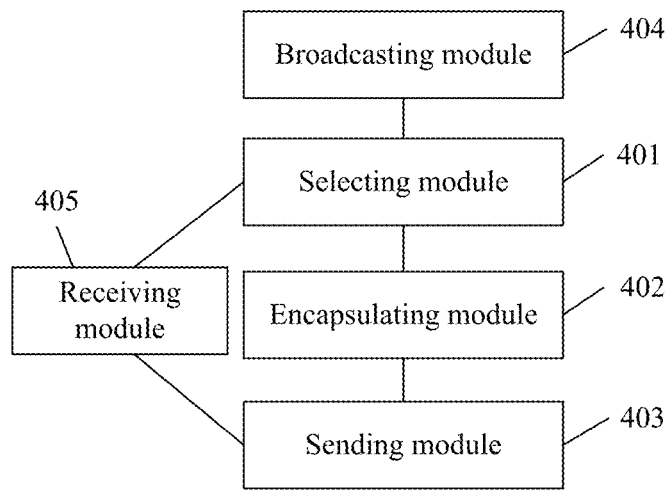
FIG. 7 is a schematic diagram of another base station according to another embodiment of the present invention.

In this embodiment, referring to FIG. 7, the base station further includes a broadcasting module 404, which is configured to send the identifier information of the second relay to the first relay, so that the first relay can calculate the first joint identifier according to the identifier information of the first relay and the identifier information of the second relay, and can descramble the HS-SCCH according to the first joint identifier after receiving the scrambled HS-SCCH.

Optionally, the broadcasting module is further configured to encrypt the identifier information of the second relay before sending the identifier information of the second relay to the first relay.

In this embodiment, referring to FIG. 7, the base station further includes a receiving module 405, which is configured to, before the base station schedules the first relay, receive optimal coding code book information fed back by the first relay, and obtain an orthogonal relay set of the first relay according to the optimal code book information of the first relay.

Optionally, the sending module is further configured to send the orthogonal relay set of the first relay to the first relay, so that the first relay can obtain information of a second joint identifier according to identifier information of relays in the orthogonal relay set, and can descramble the HS-SCCH according to the second joint identifier after receiving the scrambled HS-SCCH.

The embodiment of the base station of the present invention provides the following beneficial effects. When the base station performs transmission for two relays, one HS-SCCH serves two relays, which reduces occupation of limited HS-SCCHs. As compared with the mode in which either of two relays uses one HS-SCCH, a waste of data code channels caused by limited HS-SCCHs is well reduced, and therefore system throughput is improved.

Figure 8:
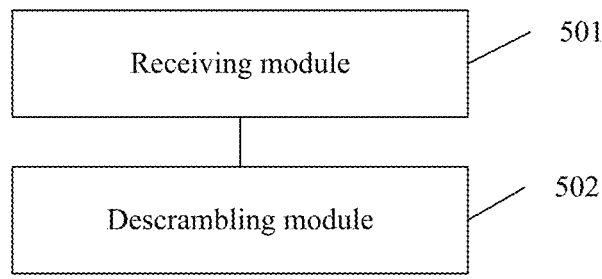
FIG. 8 is a schematic diagram of a first relay according to another embodiment of the present invention.

Referring to FIG. 8, this embodiment provides a first relay, including a receiving module 501 and a descrambling module 502.

The receiving module 501 is configured to receive a high speed downlink shared control channel HS-SCCH sent by a base station, where control channel information of the first relay and control channel information of a second relay are encapsulated in the HS-SCCH. An optimal precoding code book selected by the second relay is orthogonal to an optimal precoding code book selected by the first relay.

The descrambling module 502 is configured to descramble the HS-SCCH to obtain the control channel information of the first relay.

Preferably, in this embodiment, when the HS-SCCH uses a first joint identifier of the first relay and the second relay for scrambling, the receiving module 501 is further configured to receive identifier information of the second relay broadcast by the base station, and obtain the first joint identifier of the first relay and the second relay according to identifier information of the first relay and the identifier information of the second relay.

The descrambling module 502 is specifically configured to descramble the HS-SCCH according to the first joint identifier to obtain the control channel information of the first relay.

Figure 9:
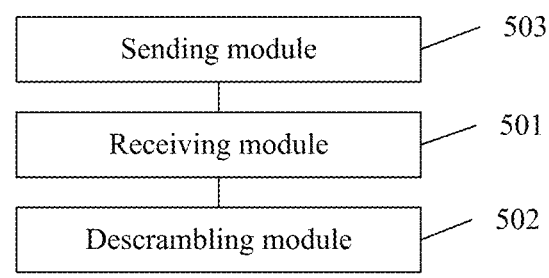
FIG. 9 is a schematic diagram of another first relay according to another embodiment of the present invention.

In this embodiment, referring to FIG. 9, when the HS-SCCH uses the first joint identifier of the first relay and the second relay for scrambling. The first relay further includes a sending module 503, which is configured to feed back optimal precoding code book information of the first relay to the base station, so that the base station obtains an orthogonal relay set of the first relay according to the optimal precoding code book information of the first relay. Also, the receiving module 501 is further configured to receive the orthogonal relay set of the first relay sent by the base station, and obtain information of a second joint identifier according to identifier information of relays in the orthogonal relay set. The descrambling module is specifically configured to descramble the HS-SCCH according to the second joint identifier.

The embodiment of the first relay of the present invention provides the following beneficial effects. When the base station performs MU-MIMO transmission for two relays, one HS-SCCH serves two MU-MIMO relays, which reduces occupation of limited HS-SCCHs. After receiving the HS-SCCH, the first relay and the second relay respectively descramble the HS-SCCH to obtain corresponding control channel information. As compared with the mode in which either of two MU-MIMO relays uses one HS-SCCH, a waste of data code channels caused by limited HS-SCCHs is well reduced, and therefore system throughput is improved.

Figure 10:
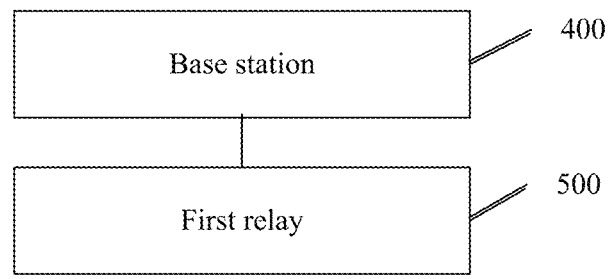
FIG. 10 is a schematic diagram of a system for sending and receiving control channel information according to an embodiment of the present invention.

Referring to FIG. 10, this embodiment provides a system for sending and receiving control channel information, where the system includes the above base station 400 and the above first relay 500.

The selecting module 401 is configured to the following. When the base station schedules a first relay, select a second relay according to an optimal precoding code book selected by the first relay, where an optimal precoding code book selected by the second relay is orthogonal to the optimal precoding code book selected by the first relay.

The encapsulating module 402 is configured to encapsulate control channel information of the first relay and control channel information of the second relay into a high speed downlink shared control channel HS-SCCH, and scramble the HS-SCCH.

The sending module 403 is configured to send the scrambled HS-SCCH to the first relay and the second relay.

Preferably, in this embodiment, the encapsulating module 402 includes a scrambling unit, which is configured to obtain a first joint identifier of the first relay and the second relay according to identifier information of the first relay and identifier information of the second relay, and scramble the HS-SCCH according to the first joint identifier.

Preferably, in this embodiment, the scrambling unit includes a calculating subunit, which is configured to perform an exclusive-OR operation on the identifier information of the first relay and the identifier information of the second relay to obtain the first joint identifier of the first relay and the second relay.

In this embodiment, the base station further includes a broadcasting module 404, which is configured to send the identifier information of the second relay to the first relay, so that the first relay can calculate the first joint identifier according to the identifier information of the first relay and the identifier information of the second relay, and can descramble the HS-SCCH according to the first joint identifier after receiving the scrambled HS-SCCH.

Optionally, the broadcasting module is further configured to encrypt the identifier information of the second relay before sending the identifier information of the second relay to the first relay.

In this embodiment, the base station further includes a receiving module 405, which is configured to before the base station schedules the first relay, receive optimal coding code book information fed back by the first relay, and obtain an orthogonal relay set of the first relay according to the optimal code book information of the first relay.

Optionally, the sending module is further configured to send the orthogonal relay set of the first relay to the first relay, so that the first relay can obtain information of a second joint identifier according to identifier information of relays in the orthogonal relay set, and can descramble the HS-SCCH according to the second joint identifier after receiving the scrambled HS-SCCH.

The first relay 500 includes a receiving module 501 and a descrambling module 502.

The receiving module 501 is configured to receive the high speed downlink shared control channel HS-SCCH sent by the base station, where control channel information of the first relay and control channel information of the second relay are encapsulated in the HS-SCCH. The optimal precoding code book selected by the second relay is orthogonal to the optimal precoding code book selected by the first relay.

The descrambling module 502 is configured to descramble the HS-SCCH to obtain the control channel information of the first relay.

Preferably, in this embodiment, when the HS-SCCH uses the first joint identifier of the first relay and the second relay for scrambling. The receiving module 501 is further configured to receive identifier information of the second relay broadcast by the base station, and obtain the first joint identifier of the first relay and the second relay according to the identifier information of the first relay and the identifier information of the second relay.

The descrambling module 502 is specifically configured to descramble the HS-SCCH according to the first joint identifier to obtain the control channel information of the first relay.

In this embodiment, when the HS-SCCH uses the first joint identifier of the first relay and the second relay for scrambling, the first relay further includes a sending module 503, which is configured to feed back optimal precoding code book information of the first relay to the base station, so that the base station obtains an orthogonal relay set of the first relay according to the optimal precoding code book information of the first relay. The receiving module 501 is further configured to receive the orthogonal relay set of the first relay sent by the base station, and obtain information of the second joint identifier according to identifier information of relays in the orthogonal relay set. The descrambling module is specifically configured to descramble the HS-SCCH according to the second joint identifier.

The embodiment of the system of the present invention provides the following beneficial effects. When the base station performs transmission for two relays, one HS-SCCH serves two relays, which reduces occupation of limited HS-SCCHs. As compared with the mode in which either of two relays uses one HS-SCCH, a waste of data code channels caused by limited HS-SCCHs is well reduced, and therefore system throughout is improved.

The device and system provided by this embodiment may specifically belong to the same idea as the method embodiment. The specific implementation of the device and system has been described in detail in the method embodiment and is not repeatedly described herein.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk and the like.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. A method for sending control channel information, the method comprising:
   selecting, by a base station, a second relay according to an optimal precoding code book selected by a first relay when the base station schedules the first relay, wherein an optimal precoding code book selected by the second relay is orthogonal to the optimal precoding code book selected by the first relay;
   encapsulating control channel information of the first relay and control channel information of the second relay into a high speed downlink shared control channel (HS-SCCH);
   scrambling the HS-SCCH; and
   sending the scrambled HS-SCCH to the first relay and the second relay.

2. The method according to claim 1, wherein scrambling the HS-SCCH comprises obtaining a first joint identifier of the first relay and the second relay according to identifier information of the first relay and identifier information of the second relay, and scrambling the HS-SCCH according to the first joint identifier.

3. The method according to claim 2, wherein obtaining the first joint identifier of the first relay and the second relay comprises performing a an exclusive-OR operation on the identifier information of the first relay and the identifier information of the second relay to obtain the first joint identifier of the first relay and the second relay.

4. The method according to claim 2, further comprising sending, by the base station, the identifier information of the second relay to the first relay, so that the first relay calculate the first joint identifier according to the identifier information of the first relay and the identifier information of the second relay, and can descramble the HS-SCCH according to the first joint identifier after receiving the scrambled HS-SCCH.

5. The method according to claim 4, wherein before sending the identifier information of the second relay to the first relay, the method further comprises encrypting the identifier information of the second relay.

6. The method according to claim 1, wherein, before the base station schedules the first relay, the method further comprises receiving, by the base station, optimal precoding code book information fed back by the first relay, obtaining an orthogonal relay set of the first relay according to the optimal precoding code book information of the first relay, and sending the orthogonal relay set of the first relay to the first relay, so that the first relay can obtain information of a second joint identifier according to identifier information of relays in the orthogonal relay set, and can descramble the HS-SCCH according to the second joint identifier after receiving the scrambled HS-SCCH.

7. A method for receiving control channel information, the method comprising:
receiving, by a first relay, a high speed downlink shared control channel (HS-SCCH) sent by a base station, wherein control channel information of the first relay and control channel information of a second relay are encapsulated in the HS-SCCH and an optimal precoding code book selected by the second relay is orthogonal to an optimal precoding code book selected by the first relay; and
descrambling, by the first relay, the HS-SCCH to obtain the control channel information of the first relay.

8. The method according to claim 7, wherein the HS-SCCH uses a first joint identifier of the first relay and the second relay for scrambling and wherein the method further comprises:
receiving, by the first relay, identifier information of the second relay broadcast by the base station; and
obtaining the first joint identifier of the first relay and the second relay according to identifier information of the first relay and the identifier information of the second relay; and
wherein descrambling the HS-SCCH to obtain the control channel information of the first relay comprises descrambling, by the first relay, the HS-SCCH according to the first joint identifier to obtain the control channel information of the first relay.

9. The method according to claim 7, wherein the HS-SCCH uses a first joint identifier of the first relay and the second relay for scrambling and wherein the method further comprises:
feeding back, by the first relay, optimal precoding code book information of the first relay to the base station, so that the base station obtains an orthogonal relay set of the first relay according to the optimal precoding code book information of the first relay;
receiving, by the first relay, the orthogonal relay set of the first relay sent by the base station; and
obtaining information of a second joint identifier according to identifier information of relays in the orthogonal relay set;
wherein descrambling the HS-SCCH comprises descrambling, by the first relay, the HS-SCCH according to the second joint identifier.

10. A base station, comprising:
a selecting module, configured to, when the base station schedules a first relay, select a second relay according to an optimal precoding code book selected by the first relay, wherein an optimal precoding code book selected by the second relay is orthogonal to the optimal precoding code book selected by the first relay;
an encapsulating module, configured to encapsulate control channel information of the first relay and control channel information of the second relay into a high speed downlink shared control channel (HS-SCCH) and to scramble the HS-SCCH; and
a sending module, configured to send the scrambled HS-SCCH to the first relay and the second relay.

11. The base station according to claim 10, wherein the encapsulating module comprises a scrambling unit, configured to obtain a first joint identifier of the first relay and the second relay according to identifier information of the first relay and identifier information of the second relay, and scramble the HS-SCCH according to the first joint identifier.

12. The base station according to claim 11, wherein the scrambling unit comprises a calculating subunit, configured to perform an exclusive-OR operation on the identifier information of the first relay and the identifier information of the second relay to obtain the first joint identifier of the first relay and the second relay.

13. The base station according to claim 11, further comprising a broadcasting module, configured to send the identifier information of the second relay to the first relay, so that the first relay can calculate the first joint identifier according to the identifier information of the first relay and the identifier information of the second relay and can descramble the HS-SCCH according to the first joint identifier after receiving the scrambled HS-SCCH.

14. The base station according to claim 13, wherein the broadcasting module is further configured to encrypt the identifier information of the second relay before sending the identifier information of the second relay to the first relay.

15. The base station according to claim 10, further comprising:
a receiving module, configured to, before the base station schedules the first relay, receive optimal code book information fed back by the first relay and obtain an orthogonal relay set of the first relay according to the optimal code book information of the first relay;
wherein the sending module is further configured to send the orthogonal relay set of the first relay to the first relay, so that the first relay can obtain information of a second joint identifier according to identifier information of relays in the orthogonal relay set, and can descramble the HS-SCCH according to the second joint identifier after receiving the scrambled HS-SCCH.

16. A first relay, comprising:
a receiving module, configured to receive a high speed downlink shared control channel (HS-SCCH) sent by a base station, wherein control channel information of the first relay and control channel information of a second relay are encapsulated in the HS-SCCH and wherein an optimal precoding code book selected by the second relay is orthogonal to an optimal precoding code book selected by the first relay; and a descrambling module, configured to descramble the HS-SCCH to obtain the control channel information of the first relay.

17. The relay according to claim 16, wherein, when the HS-SCCH uses a first joint identifier of the first relay and the second relay for scrambling, the receiving module is further configured to receive identifier information of the second relay broadcast by the base station and to obtain the first joint identifier of the first relay and the second relay according to identifier information of the first relay and the identifier information of the second relay; and wherein the descrambling module is configured to descramble the HS-SCCH according to the first joint identifier to obtain the control channel information of the first relay.

18. The relay according to claim 16, wherein, when the HS-SCCH uses a first joint identifier of the first relay and the second relay for scrambling, the first relay further comprises:

a sending module, configured to feed back optimal precoding code book information to the base station, so that the base station obtains an orthogonal relay set of the first relay according to the optimal precoding code book information of the first relay;

wherein the receiving module is further configured to receive the orthogonal relay set of the first relay sent by the base station and to obtain information of a second joint identifier according to identifier information of relays in the orthogonal relay set; and wherein the descrambling module is configured to descramble the HS-SCCH according to the second joint identifier.

19. A system for sending and receiving control channel information, wherein the system comprises:

a first relay; and a base station comprising:

a selecting module, configured to, when the base station schedules the first relay, select a second relay according to an optimal precoding code book selected by the first relay, wherein an optimal precoding code book selected by the second relay is orthogonal to the optimal precoding code book selected by the first relay;

an encapsulating module, configured to encapsulate control channel information of the first relay and control channel information of the second relay into a high speed downlink shared control channel (HS-SCCH) and to scramble the HS-SCCH; and a sending module, configured to send the scrambled HS-SCCH to the first relay and the second relay.

20. The system according to claim 19, further comprising the second relay.

* * * * *